United States Patent [19]

Hosokawa

[11] Patent Number: 4,787,485
[45] Date of Patent: Nov. 29, 1988

[54] BICYCLE CALIPER BRAKE ASSEMBLY
[75] Inventor: Mikio Hosokawa, Fukui, Japan
[73] Assignee: Maeda Industries, Ltd., Osaka, Japan
[21] Appl. No.: 60,320
[22] Filed: Jun. 10, 1987
[51] Int. Cl.[4] .................................................. B62L 1/12
[52] U.S. Cl. ................................ 188/24.12; 188/72.3
[58] Field of Search .............. 188/24.12, 24.11, 24.21, 188/24.22, 72.3, 72.9

[56] References Cited
U.S. PATENT DOCUMENTS
4,635,759  1/1987  Nagano ........................... 188/24.22

FOREIGN PATENT DOCUMENTS
1019440  1/1953  France ............................. 188/24.22
1143998  10/1957  France ........................... 188/24.22
0435588  6/1949  Italy ................................. 188/24.22
136283   9/1985  Japan .

Primary Examiner—Douglas C. Butler
Assistant Examiner—Mark T. Le
Attorney, Agent, or Firm—Birch, Stewart, Kolasch & Birch

[57] ABSTRACT

A bicycle caliper brake assembly comprising a pair of pivotal calipers respectively having bosses rotatably fitted on a support shaft as interposed between an intermediate flange of the shaft and a double nut adjustably screwed on the shaft, the bosses being axially movable relative to each other on the shaft to assume their respective preassembled and assembled positions, one of the calipers being formed with a projecting portion which engages the other caliper to prevent both calipers from pivoting away from each other more than a predetermined amount when the bosses assume the assembled position but which disengages from the other caliper to allow both calipers to pivot away from each other more than the predetermined amount when the bosses assume the preassembled position, a coil spring system completely enclosed within the bosses for urging the calipers to pivot away from each other when the bosses assume the assembled position, wherein the spring system is maintained in a state for torsional energization even when the bosses assume the preassembled position.

7 Claims, 6 Drawing Sheets

BICYCLE CALIPER BRAKE ASSEMBLY

BACKGROUND OF THE INVENTION

1. Field of the Invention

The present invention relates to a bicycle caliper brake assembly, and more particularly to a caliper brake assembly of the type which has a completely concealed return spring system to prevent rusting, by the rain water, of the spring system in addition to providing attractive appearance and improved aerodynamic characteristics.

2. Description of the Prior Art

As is well known, a side-pull type caliper brake assembly, which is most commonly used in current bicycles, comprises a pair of brake calipers pivotally supported on a support shaft and always urged by a return spring to pivot away from each other. Conventionally, such a return spring is exposed to the exterior, so that it is subjected to the adverse influences of the rain water, mud, dust, and so on. Further, the exposed return spring deteriorates the visual attractiveness and aerodynamic characteristics of the overall brake assembly.

In order to avoid these drawbacks of the exposed return spring, Japanese Utility Model Application Laid-open No. 60-136283 (Laid-open: Sept. 10, 1985; Appln. No. 59-24698; Filed: Feb. 22, 1984; Applicant: Shimano Industrial Co. Ltd.; Inventor: Masashi NAGANO) proposes an improved caliper brake assembly employing a completely concealed or enclosed return spring system. More specifically, the brake assembly of this laid-open application comprises first and second calipers respectively having bosses rotatably fitted on a support shaft as interposed between an intermediate flange of the shaft and a double nut adjustably screwed on the shaft. An engaging disk is non-rotatably fitted on the support shaft between the first and second calipers. Both calipers are biased to pivot away from each other by first and second coil springs respectively accommodated within the bosses of the first and second calipers. The second spring has one end directly engaging the boss of the second caliper and the other end caught by the engaging disk. Thus, the second caliper is always under the influence of the second spring. The brake assembly further includes an operating member which is especially provided for initial energization of the first spring.

The operating member comprises a headed sleeve rotatably fitted on the support shaft and rotatably penetrating through the boss of the first caliper to project outward therefrom toward the intermediate flange of the support shaft with the head of the sleeve positioned within the first caliper boss. The operating member further includes a lever co-rotatably fitted on the projecting end of the sleeve. The first spring has one end engaging the head of the sleeve and the other end arrested by the engaging disk. The lever of the operating member is forcibly pivoted to initially torsion the first spring and subsequently bolted to a predetermined portion of the first caliper boss to bring the first caliper under the influence of the first spring.

As described above, the prior art brake assembly requires the specially devised operating member for initial energization of the first spring. This is because one of the two calipers has a projecting portion (e.g. shoe support portion) which comes into abutment with a functional portion (e.g. connecting portion for connection to a control cable) of the other caliper, thereby preventing both calipers to pivot away from each other to their preparatory position for initial torsional energization of the spring. Thus, it becomes necessary to employ some means which enables initial energization of the spring irrespective of the relative position between the two calipers.

Naturally, the operating member of the prior art brake assembly is an additional component which is used only for initial energization of the first spring but cannot be removed even after such energization, consequently complicating the overall structure of the assembly. Further, subsequent bolting, to the first caliper boss, of the lever of the operating member necessitates exact positional adjustment between the lever and the boss and thereby requires a lot of skill.

SUMMARY OF THE INVENTION

It is, therefore, an object of the present invention to provide a bicycle caliper brake assembly which, while employing a completely concealed or enclosed return spring system, enables ready initial energization of the spring system without the use of an additional component for this purpose.

Another object of the invention is to provide a bicycle caliper brake assembly which ensures smooth pivotal movement of both calipers.

A further object of the invention is to provide a bicycle caliper brake assembly which is free of axial play of both calipers.

According to the present invention, there is provided a bicycle caliper brake assembly comprising: a support shaft having an intermediate flange; a pair of calipers respectively having bosses rotatably fitted on the shaft axially one behind the other, so that the calipers are pivotally movable toward and away from each other; the bosses respectively defining annular accommodating spaces; the bosses being axially movable relative to each other on the shaft to assume their respective preassembled and assembled positions; locking means adjustably mounted on the shaft so that the bosses are interposed between the locking means and the flange; one of the calipers being formed with a projecting portion which engages the other caliper to prevent it from pivoting away from the one caliper more than a predetermined amount when the bosses assume the assembled position but which disengages from the other caliper to allow it to pivot away from the one caliper more than the predetermined amount when the bosses assume the preassembled position; coil spring means completely enclosed within the accommodating spaces of the bosses for urging the calipers to pivot away from each other when the bosses assume the assembled position; and means for maintaining the spring means in a state for torsional energization thereof even when the bosses assume the preassembled position.

According to a preferred embodiment of the invention, the spring means comprises a pair of coil springs each housed within the accommodating space of a corresponding boss with its one end engaging therewith, and the maintaining means comprises a pair of engaging disks non-rotatably but axially slidably fitted on the support shaft and each engaging the other end of a corresponding coil spring. In this case, the coil springs advantageously have such a natural axial length that they are axially compressed when the bosses assume the assembled position.

Preferably, a first thrust bearing is interposed between the flange of the support shaft and one of the bosses, while a second thrust bearing is interposed between the locking means and the other boss.

Other objects, features and advantages of the invention will become apparent from the following description of the preferred embodiments given with reference to the accompanying drawings.

DETAILED DESCRIPTION OF THE INVENTION

Figure 1:
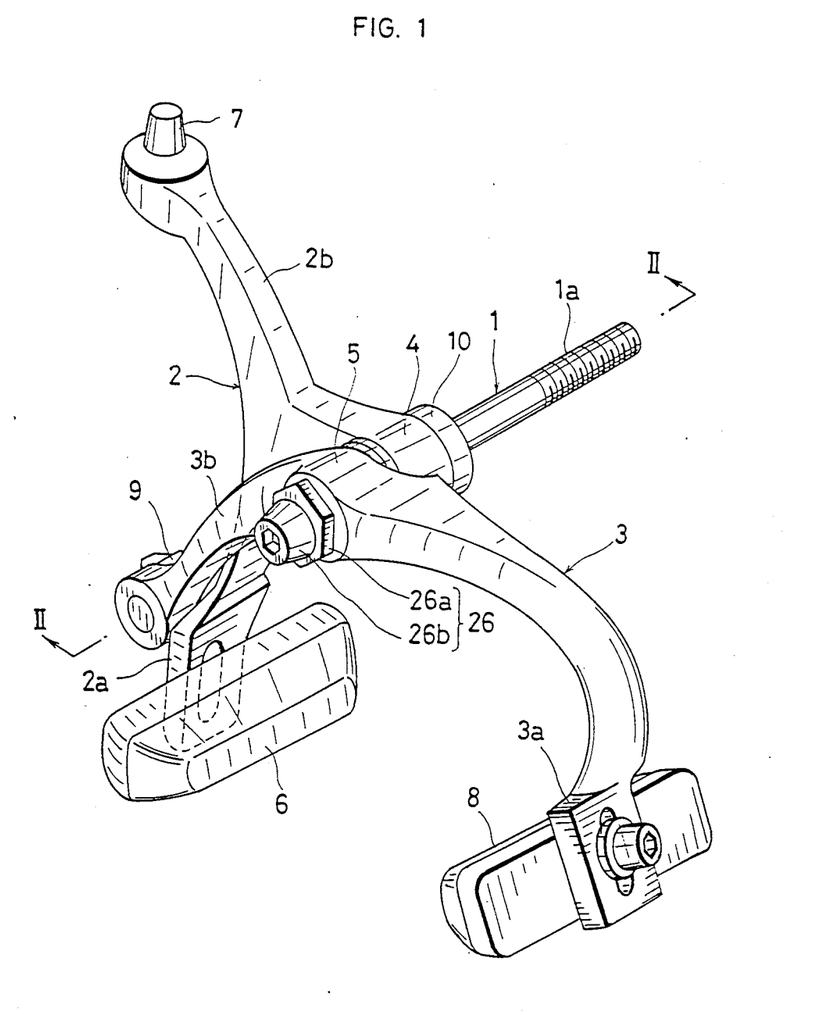
FIG. 1 is a perspective view showing the entirety of a caliper brake assembly embodying the invention.

Referring now to FIG. 1 of the accompanying drawings, a caliper brake assembly according to the present invention has a pair of brake calipers which are pivotally mounted on a common support shaft 1. These calipers are hereinafter referred to respectively as first caliper 2 and second caliper 3 when distinction between the two is required. The calipers 2, 3 respectively have bosses 4, 5 which are rotatably fitted on the support shaft 1 one behind the other. The calipers 2, 3 extend downward from the respective bosses 4, 5 in a curved fashion on both sides of the support shaft 2, so that they partially surround a cross section of bicycle wheel tire (not shown).

The first caliper 2 is formed at its lower free end with a shoe support portion 2a on which is mounted an inwardly directed brake shoe 6. The first caliper 2 is further formed at an intermediate position thereof with an integral connecting portion 2b which extends obliquely upward. The upper free end of the connecting portion 2b is provided with a connector 7 for connection to an outer cable or sheath of a known double type control cable (not shown).

The second caliper 3 is also formed at its lower free end with shoe support portion 3a on which is mounted an inwardly directed brake shoe 8 in opposed relation to the other brake shoe 6. The second caliper 3 further has an integral connecting portion 3b extending downward from the boss 5 on the side of the support shaft 1 opposite the shoe support portion 3a. The free end of the connecting portion 3b is connected to an inner cable of the unillustrated double type control cable by means of a connector 9.

The support shaft 1 has a first threaded end section 1a which, in combination with an unillustrated nut, is used for mounting to a suitable part (e.g. fork crown or connecting rod extending between a pair of fork stay tubes) of an unillustrated bicycle frame.

Both calipers 2, 3 are always urged away from each other by a return spring system which is rendered invisible by being incorporated within their respective bosses 4, 5, as hereinafter described.

In the non-braking position illustrated in FIG. 1, the shoe support portion 2a of the first caliper 2 engages the underside of the second caliper connecting portion 3b under the biasing force of the spring system to prevent further expansion of the calipers 2, 3. In other words, the shoe support portion 2a of the first caliper 2 also serves as a stopper which holds the respective brake shoes 6, 8 at a predetermined small distance from a bicycle wheel rim (not shown) to ensure a quick response upon a braking operation.

When an unillustrated remote control lever is operated to pull up the inner cable of the unillustrated double type control cable, the distance between the respective caliper connecting portions 2b, 3b is forcibly reduced to bring the brake shoes 6, 8 toward each other into braking contact with the unillustrated wheel rim.

Figure 2:
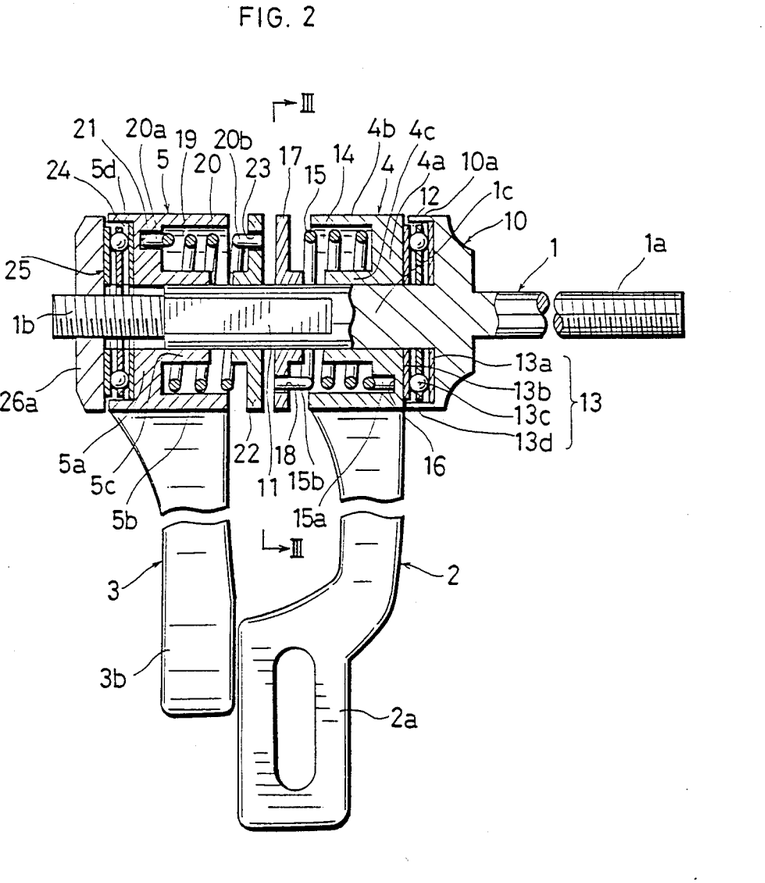
FIG. 2 is a slightly enlarged view in section taken on lines II—II in FIG. 1 to show the brake assembly in a preassembled condition.
Figure 3:
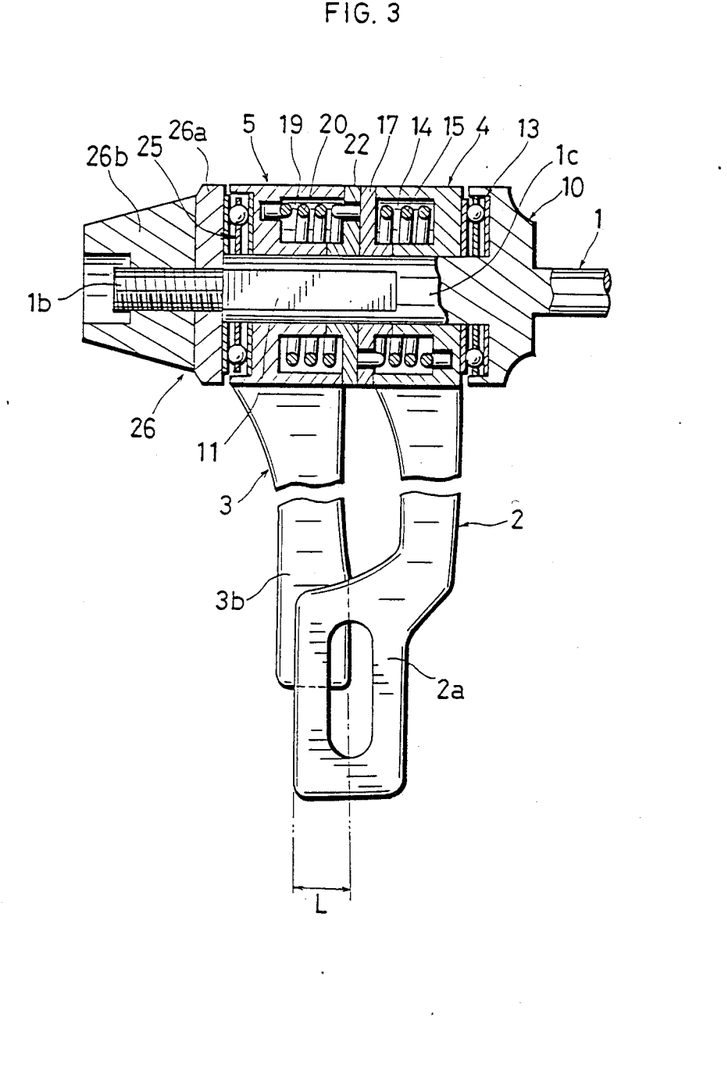
FIG. 3 is a sectional view similar to FIG. 2 but showing the brake assembly in a completely assembled condition.

As illustrated in FIGS. 2 and 3, the support shaft 1 has an intermediate flange 10 and a second threaded end section 1b axially opposite the first threaded end section 1a. The shaft 1 further has a caliper support section 1c positioned between the flange 10 and the second end section 1b. For the purpose to be described later, the caliper support section 1c is partially made non-circular in cross section by forming a pair of diametrically opposite flat surfaces 11 (see FIG. 4).

The intermediate flange 10 of the support shaft 1 is formed with a cylindrical extension 10a projecting toward the first caliper boss 4 to define an annular space 12 to accommodate a first thrust bearing 13.

The thrust bearing 13 comprises a pair of axially spaced load bearing plates 13a, 13b and a circular row of steel balls 13c rotatably held by a retainer ring 13d between the bearing plates.

The boss 4 of the first caliper 2 comprises an end wall 4a and outer and inner cylindrical portions 4b, 4c extending coaxially toward the boss 5 of the second caliper 3, thereby forming an annular space 14. The inner cylindrical portion 4c is rotatably and axially slidably fitted on the caliper support portion 1c of the support shaft 1.

A first coil spring 15 is accommodated in the annular space 14 of the first caliper boss 4. One end 15a of the spring 15 is fitted in an engaging bore 16 formed in the end wall 4a of the boss 4, whereas the other end of the spring 15 is received in an engaging bore 18 formed in the wall thickness of a first engaging disk 17. The natural length of the spring is set slightly larger than the axial length of the annular space 14 for the purpose to be described later.

Figure 4:
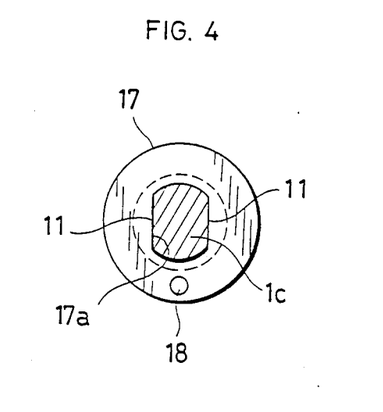
FIG. 4 is a section taken on lines III—III in FIG. 2.

As illustrated in FIG. 4, the engaging disk 17 has a non-circular central hole 17a corresponding in shape to the cross section of the flattened part 11 of the support shaft 1. Thus, the disk 17 is non-rotatable but axially slidable relative to the flattened part 11 of the support shaft 1.

The boss 5 of the second caliper 3 comprises an intermediate wall 5a and outer and inner cylindrical portions 5b, 5c extending coaxially toward the boss 4 of the first caliper 2, thereby defining an annular space 19. The inner cylindrical portion 5c rotatably and axially slidably fitted on the caliper support portion 1c of the support shaft 1.

A second coil spring 20 is accommodated in the annular space 19 of the second caliper boss 5. One end 20a of the second spring 20 is received in an engaging bore 21 formed in the intermediate wall of the boss 5, while the other end 20b is inserted in an engaging bore 23 formed in the wall thickness of a second engaging disk 22. The natural length of this second spring is also set slightly larger than the axial length of its associated annular space for the purpose to be described later.

The second engaging disk 22 is substantially identical in configuration and function to the first engaging disk 17 illustrated in FIG. 4, except that the position of the engaging bore 23 is diametrically opposite to the engaging bore 18 of the first engaging disk 17.

The boss 5 of the second caliper 3 further has a cylindrical extension 5d which projects from the intermediate wall 5a in the direction opposite to the outer cylindrical portion 5c. This cylindrical extension 5d defines another annular space 24 in which is housed a second thrust bearing 25 identical in arrangement to the first thrust bearing 13.

Designated by reference numeral 26 in FIG. 3 is a double nut consisting of a tightening nut body 26a and a lock nut body 26b. The double nut 26 is screwed on the second threaded end section 1b of the support shaft 1 in a fully assembled condition to keep both calipers 2, 3 in position, as illustrated in FIG. 3.

Assembling of the caliper brake and energizing of the two springs 15, 20 are conducted in the following manner.

Both calipers 2, 3, both thrust bearings 12, 25, both coil springs 15, 20, both engaging disks 17, 22, and the tightening nut body 25a of the double nut body 26 are initially mounted on the support shaft 1 into the preparatory or preassembled condition shown in FIG. 2. In this condition, the bosses 4, 5 of the two calipers 2, 3 are axially spaced from each other, so that the connecting portion 3b of the second caliper 3 clears the shoe support portion 2a of the first caliper 2. Despite such large axial spacing between the two bosses 2, 3, the respective springs 15, 20, which are in natural state can still retain engagement with their associated engaging bores 16, 18, 21, 23, because the respective engaging disks 17, 22 are axially movable away from each other toward the corresponding bosses 4, 5.

Figure 5:
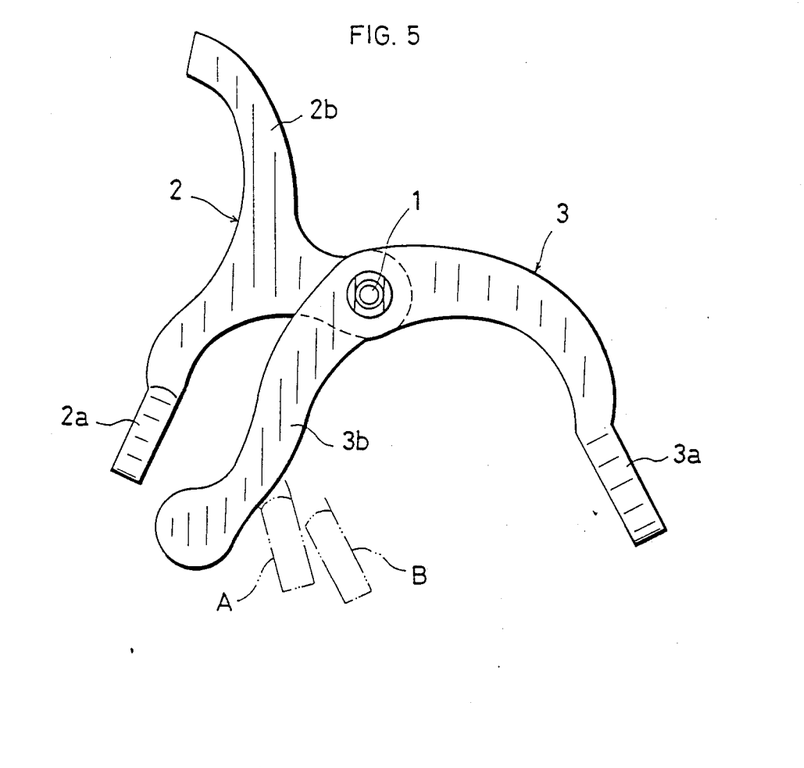
FIG. 5 is a somewhat schematic front view illustrating the manner of initially energizing a spring system.

In the condition illustrated in FIG. 2, the springs 15, 20 are now ready for energizing by pivotal movement of the calipers 2, 3 which, at this time, are excessively spaced away from each other so that the shoe support portion 2a of the first caliper 2 is positioned pivotally outwardly of the connecting portion 3b of the second caliper 3, as indicated by solid lines in FIG. 5.

To energize the springs 15, 20, the calipers 2, 3 are forcibly pivoted manually toward each other so that the shoe support portion 2a of the first caliper 2 is shifted slightly past its normal non-braking position indicated by phantom lines A in FIG. 5 to be positioned inwardly of the connecting portion 3b of the second caliper 3, as indicated by phantom lines B in FIG. 5. During such pivotal movement of the calipers 2, 3, the shoe support portion 2a of the first caliper 2 does not interfere with the connecting portion 3b of the second caliper 3, because the calipers 2, 3 are spaced axially of the support shaft 1 to a sufficient extent as described hereinbefore. It is to be noted that only the post-movement relative positions of the first caliper shoe support portion 2a are shown in FIG. 5 for convenience of illustration.

Subsequently, the second caliper 3 is moved axially of the support shaft 1 toward the first caliper 2 by screwably advancing the tightening nut body 26a of the double nut 26, as shown in FIG. 3. This results in that the bosses 4, 5 of the calipers 2, 3 come into abutment with the respective engaging disks 17, 22 which in turn come into abutment with each other, thereby completely closing the spring accommodation spaces 14, 19 to protect the springs 15, 20 against rain and dust. Such axial movement of the bosses 4, 5 further causes axial compression of the springs 15, 20 which has been torsionally energized in the foregoing step.

Finally, the lock nut body 26b of the double nut 26 is screwed onto the second threaded end section 1b of the support shaft 1 into frictional contact with the tightening nut body 26a, and the calipers 2, 3 are freed from manual restriction to pivot away from each other. However, since the shoe support portion 2a of the first caliper 2 overlaps the connecting portion 3b of the second caliper 3 by an amount L (FIG. 3) due to axial near approach between the bosses 4, 5, the shoe support portion 2a engages the connecting portion 3b at the phantom line (non-braking) position A, as illustrated in FIG. 5.

According to the thus completed caliper brake assembly, the first and second calipers 2, 3 are pivotally forced away from each other respectively by the restoring force of the first and second springs 15, 20 but prevented from pivoting past their non-braking position by the engagement of the first caliper shoe support portion 2a with the second caliper connecting portion 3b.

The return springs 15, 20 are entirely housed within the corresponding annular spaces 14, 19 of the caliper bosses 4, 5, so that they are prevented from rusting by contact with the rain water. The spring accommodating spaces 14, 19 may be filled with a rust preventive agent, such as grease, to further improve rust prevention of the springs 15, 20. Further, complete enclosure of the springs 15, 20 within the bosses 4, 5 not only provides a visually attractive appearance but also improves aerodynamic characteristics of the brake assembly.

According the example illustrated in FIGS. 1 to 5, each return spring 15(20) has an initial axial length larger than the depth of a corresponding spring accommodation space 14(19) prior to energization (see FIG. 2) but is axially compressed after energization (see FIG. 3). Such axial compression of the coil spring 15(20) increases the torsionally stored energy thereof to provide an increased return force for the caliper 2(3). Further, the thus axially compressed spring 15(20) acts to force the caliper boss 4(5) against the thrust bearing 13(25) while tending to reduce friction between the boss 4(5) and the engaging disk 17(22), consequently ensuring smooth pivotal movement of the caliper 2(3) and inhibiting axial play of the caliper during operation.

The second thrust bearing 25 which is interposed between the second caliper boss 5 and the double nut 26 serves to prevent the pivotal force of the second caliper 3 from being transmitted to the double nut 26, which means no unexpected loosening of the double nut 26 during operation.

The most significant feature of the present invention resides in that the return springs 15, 20 can remain in a state for subsequent torsional energization even if the first and second calipers 2, 3 are axially spaced enough for the connecting portion 3b of the second caliper 3 to clear (not interfere with) the shoe support portion 2a of the first caliper 2.

According to the example illustrated in FIGS. 1 to 5, the two separate engaging disks 17, 22 are individually movable axially along the flattened part 11 of the support shaft 1 for engagement with the corresponding return springs 15, 20 in natural state. Thus, the springs 15, 20 need not have such a natural length that they are compressed axially upon subsequent near approach between the bosses 4, 5 of the calipers 2, 3 although the illustrated arrangement is preferred for smooth pivotal movement of the calipers 2, 3.

Figure 6:
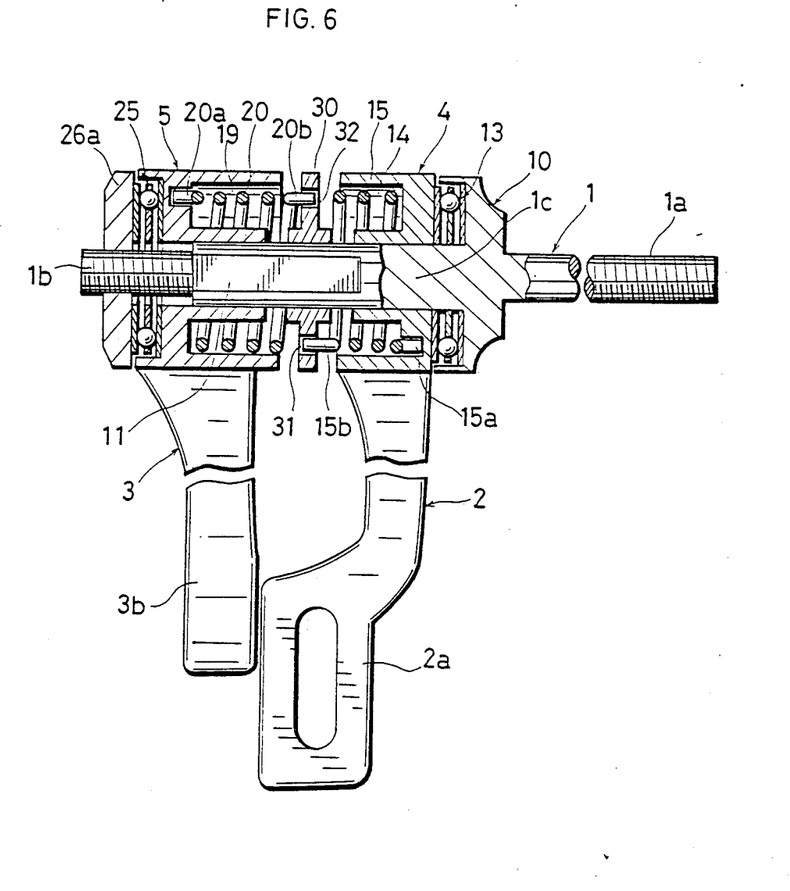
FIG. 6 is a sectional view similar to FIG. 2 but showing a modified caliper brake assembly according to the invention.

FIG. 6 illustrates another embodiment of the present invention which differs from the foregoing embodiment only in that only a single engaging disk 30 is used. More specifically, the engaging disk 30 is formed with a diametrically opposite pair of engaging bores 31, 32 for engagement with both of the first and second springs 15, 20. The springs 15, 20 in this embodiment must have such a natural axial length that they can maintain their engagement with the disk 30 and the corresponding bosses 4, 5 even if the bosses are axially spaced enough for the connecting portion 3b of the second caliper 3 to clear the shoe support portion 2a of the first caliper 2, thereby enabling subsequent torsional energization of the two springs.

Figure 7:
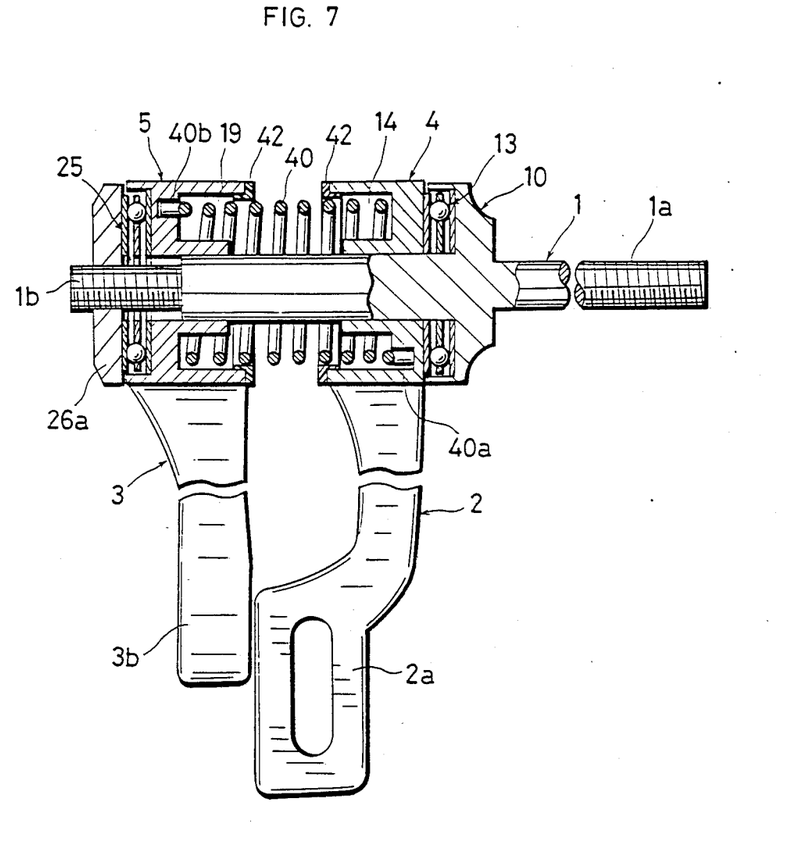
FIG. 7 is a sectional view also similar to FIG. 2 but showing another modified caliper brake assembly according to the invention.

According to a further embodiment illustrated in FIG. 7, instead of too separate return springs, only a single coil spring 40 is used which engages at one end 40a thereof with the boss 4 of the first caliper 2 and at the other end 40b with the boss 5 of the second caliper 3. As is appreciated, no engaging disk is provided, requiring no flattened part of the support shaft 1 for non-rotatable mounting thereof. Similarly to the embodiment of FIG. 6, the single spring 40 needs to have such a natural axial length that it still engages with the respective bosses 4, 5 even if the bosses are axially spaced enough for the connecting portion 3b of the second caliper to clear the shoe support portion 2a of the first caliper 2. A pair of slide rings 42 are fitted in the openings of the respective bosses 4, 5 to ensure smooth pivotal movement thereof.

The invention being thus described, it is obvious that the same may be varied in many ways. For instance, either or both of the first and second thrust bearings 13, 25 may be omitted without any detrimental influences on the basic advantages of the invention. Such variations are not to be regarded as departure from the spirit and scope of the invention, and all such modifications as would be obvious to those skilled in the art are intended to be included within the scope of the invention.

I claim:
1. A bicycle caliper brake assembly comprising:
a support shaft having an intermediate flange;
a pair of calipers respectively having bosses rotatably fitted on said shaft axially one behind the other, so said calipers are pivotally movable toward and away from each other;
said bosses respectively defining annular accommodating spaces;
said bosses being axially movable relative to each other on said shaft to assume their respective preassembled and assembled positions;
locking means adjustably mounted on said shaft so that said bosses are interposed between said locking means and said flange;
one of said calipers being formed with a projecting portion which engages the other caliper to prevent it from pivoting away from said one caliper more than a predetermined amount when said bosses assume said assembled position but which disengages from said other caliper to allow it to pivot away from said one caliper more than said predetermined amount when said bosses assume said preassembled position;
a pair of coil springs each housed completely within the accomodating space of a corresponding boss and having one end engaging said corresponding boss at a fixed position relative thereto; and
a pair of engaging disks non-rotatably but axially slidably fitted on said shaft between said bosses and each engaging the other end of a corresponding coil spring, so that each engaging disk is movable toward and away from the other engaging disks while maintianing engagement with said other end of said corresponding coil spring.
2. The brake assembly as defined in claim 1, wherein each engaging disk has a peripheral portion which is interposed between a corresponding boss and the other engaging disk when said bosses assume their respective assembled positions.
3. The brake assembly as defined in claim 2, wherein said coil springs respectively have such a natural axial length that they are axially compressed when said bosses assume said assembled position.
4. The brake assembly as defined in claim 3, wherein a first thrust bearing is interposed between said flange and one of said bosses, and
a second thrust bearing is interposed between said locking means and the other boss.
5. The brake assembly as defined in claim 4, wherein each of said first and second bearings comprises a plurality of balls rotatably held by a retainer and interposed between a pair of load bearing plates.
6. The brake assembly as defined in claim 4, wherein said flange has a cylindrical extension defining an annular space in which said first bearing is accommodated, and
said other boss also has a cylindrical extension defining a further annular space in which said second thrust bearing is housed.
7. The brake assembly as defined in claim 1, wherein said locking means is in the form of a double nut comprising a tightening nut body and a lock nut body.

* * * * *